(12) United States Patent
Lu et al.

(10) Patent No.: US 12,535,540 B2
(45) Date of Patent: Jan. 27, 2026

(54) APPARATUS FOR GENERATING A SELF-CHECK LEAKAGE CURRENT

(71) Applicant: Schneider Electric Industries SAS, Rueil-Malmaison (FR)

(72) Inventors: Feng Lu, Shanghai (CN); Xiaohang Chen, Shanghai (CN); Han Wang, Shanghai (CN); Jie Feng, Shanghai (CN); Yangfeng Song, Shanghai (CN); Jianwei Tian, Shanghai (CN); Wanlong Bai, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 156 days.

(21) Appl. No.: 18/520,397

(22) Filed: Nov. 27, 2023

(65) Prior Publication Data
US 2024/0345179 A1    Oct. 17, 2024

(30) Foreign Application Priority Data
Apr. 14, 2023   (CN) .......................... 202310402971.8

(51) Int. Cl.
*G01R 31/52*    (2020.01)
*G01R 15/18*    (2006.01)

(52) U.S. Cl.
CPC .............. *G01R 31/52* (2020.01); *G01R 15/18* (2013.01)

(58) Field of Classification Search
CPC ........ G01R 31/00; G01R 31/50; G01R 31/52; G01R 35/00; G01R 35/005; G01R 15/00;
(Continued)

(56) References Cited

U.S. PATENT DOCUMENTS

| 9,118,172 B2 | 8/2015 | Radosavljevic et al. |
| 2009/0251148 A1 | 10/2009 | Finlay, Sr. et al. |

(Continued)

FOREIGN PATENT DOCUMENTS

| CA | 1318351 C * | 5/1993 | .............. H02J 9/062 |
| DE | 102019213604 A1 | 3/2021 | |

(Continued)

OTHER PUBLICATIONS

Extended European Search Report dated Jun. 5, 2024 for corresponding European Patent Application No. 23307046.5-1002, 9 pages.

*Primary Examiner* — Hoai-An D. Nguyen
(74) *Attorney, Agent, or Firm* — Wolf, Greenfield & Sacks, P.C.

(57) ABSTRACT

An apparatus for generating a self-check leakage current is disclosed. The apparatus includes: a mechanical switch; a phase line solid-state switch arranged on a phase line and located upstream of the mechanical switch; a current transformer arranged upstream of the phase line solid-state switch; a bypass unit including a bypass switch and a bypass resistor, one end of the bypass unit is connected between the mechanical switch and the solid-state switch on the phase line, and the other end is connected to the upstream of the current transformer on the neutral line; A control unit for controlling the switching on and off of the phase line solid-state switch and the bypass switch and to receive the current value detected by the current transformer, wherein the self-check leakage current is generated when the phase line solid-state switch and the bypass switch are switched on.

20 Claims, 2 Drawing Sheets

(58) Field of Classification Search
CPC ........ G01R 15/14; G01R 15/18; H01H 83/00;
H01H 83/02; H01H 83/04; H02H 1/00;
H02H 1/0007; H02H 3/00; H02H 3/02;
H02H 3/021; H02H 3/04; H02H 3/044;
H02H 3/26; H02H 3/32; H02H 3/33;
H02H 3/334; H02H 3/335
USPC .................................................. 324/500, 509
See application file for complete search history.

(56) References Cited

U.S. PATENT DOCUMENTS

2022/0337046 A1    10/2022  Erven
2025/0080110 A1*   3/2025  Yun .................. H03K 17/08142

FOREIGN PATENT DOCUMENTS

| EP | 3012853 B1 | | 6/2019 | |
|----|---|---|---|---|
| EP | 3550581 B1 | * | 2/2024 | ............. H01H 9/542 |
| WO | 2023280730 A1 | | 1/2023 | |

\* cited by examiner

APPARATUS FOR GENERATING A SELF-CHECK LEAKAGE CURRENT

CROSS-REFERENCE TO RELATED APPLICATIONS

This application claims the benefit of priority to and incorporates herein by reference Chinese Application No. 202310402971.8 filed on Apr. 14, 2023.

TECHNICAL FIELD

The disclosure relates to apparatuses for generating a self-check leakage current.

BACKGROUND

Getting an electric shock is very dangerous when using electrical equipment. To protect the safety of a person in time when leakage occurs, it is indispensable to install a leakage protection switch in low-voltage terminal distribution equipment. The leakage protection switch includes a circuit breaker and a leakage current detection and switch driving circuit. The leakage current protection switch realizes the leakage current detection function through the current transformer. Under normal situations, the currents flowing through the phase line (Live wire) and the neutral line (Neutral wire) for a load are equal in magnitude and opposite in direction, so the resulting magnetomotive force is zero. The voltage induced by the current transformer surrounding the phase line and the neutral line is zero. When leakage occurs in a customer, the leakage current flows to the ground, so the current in the phase line is shunted, so the current in the neutral line is smaller than the current in the phase line. Finally, the resulting magnetomotive force therefore is no longer zero, and the voltage induced by the current transformer is no longer zero, so it can be determined that there is a leakage current.

To ensure the functions of the current transformer are normal, a specific leakage current can be injected into the current transformer regularly to realize self-check. However, in the distribution network so far, it is not possible to do a leakage self-check when the mechanical switch is switched off, because the mechanical switch is arranged upstream of the current transformer.

SUMMARY

An apparatus for generating a self-check leakage current based on the solid-state switch is disclosed in the present disclosure. With this apparatus, the leakage protection function of power distribution equipment can be periodically detected, and the leakage protection function can also be automatically checked before supplying power to load equipment.

The present disclosure provides an apparatus for generating a self-check leakage current, which includes: a mechanical switch which is configured to simultaneously switch on and off a phase line and a neutral line: a phase line solid-state switch arranged on a phase line and located upstream of the mechanical switch: a current transformer arranged upstream of the phase line solid-state switch, and the phase line and a neutral line pass through the current transformer: a bypass unit comprising a bypass switch and a bypass resistor connected in series, one end of the bypass unit is connected between the mechanical switch and the phase line solid-state switch on the phase line, and the other end is connected to the upstream of the current transformer on the neutral line: A control unit, which is configured to control the switching on and off of the phase line solid-state switch and the bypass switch, and to receive the current value detected by the current transformer, wherein the self-check leakage current is generated when the phase line solid-state switch and the bypass switch are switched on.

According to the embodiment of the present disclosure, in the apparatus for generating a self-check leakage current, in the case of generating the self-check leakage current, the control unit determines whether the functions of the current transformer and the phase line solid-state switch are normal according to the self-check leakage current detected by the current transformer.

According to the embodiment of the present disclosure, in the apparatus for generating a self-check leakage current, the control unit switches off the bypass switch and switches on the phase line solid-state switch when the functions of the current transformer and the phase line solid-state switch are normal, otherwise, the control unit switches off the bypass switch and the phase line solid-state switch and sends out a fault indication signal.

According to the embodiment of the present disclosure, in the apparatus for generating a self-check leakage current, before the mechanical switch is closed, the control unit switches on the phase line solid-state switch and the bypass switch.

According to the embodiment of the present disclosure, in the apparatus for generating a self-check leakage current, before the mechanical switch is closed, the mechanical switch sends a mechanical switch action signal to the control unit, and the control unit switches on the phase line solid-state switch and the bypass switch according to the mechanical switch action signal.

According to the embodiment of the present disclosure, in the apparatus for generating a self-check leakage current further includes: a current phase detection unit which is configured to detect a phase of a phase line current and to provide the phase to the control unit, wherein the control unit switches on the bypass switch according to the phase of the phase line current, so that the self-check leakage current has a predetermined initial phase.

According to the embodiment of the present disclosure, in the apparatus for generating a self-check leakage current, the phase line solid-state switch is constructed as two anti-series connected MOSFETs.

According to the embodiment of the present disclosure, in the apparatus for generating a self-check leakage current, the bypass switch is constructed as an IGBT.

The embodiment of the present disclosure also provides an apparatus for generating a self-check leakage current, which includes: a mechanical switch which is configured to simultaneously switch on and off a phase line and a neutral line: a neutral line solid-state switch arranged on the neutral line and located between the mechanical switch and the current transformer: a current transformer arranged upstream of the phase line solid-state switch, and the phase line and a neutral line pass through the current transformer: a bypass unit comprising a bypass switch and a bypass resistor connected in series, one end of the bypass unit is connected to the upstream of the current transformer on the phase line, and the other end is connected between the mechanical switch and the phase line solid-state switch on the neutral line: A control unit, which is configured to control the switching on and off of the phase line solid-state switch and the bypass switch, and to receive the current value detected by the current transformer, wherein the self-check leakage current is generated when the phase line solid-state switch and the bypass switch are switched on.

According to the embodiment of the present disclosure, in the apparatus for generating a self-check leakage current, in the case of generating the self-check leakage current, the control unit determines whether the functions of the current transformer and the neutral line solid-state switch are normal according to the self-check leakage current detected by the current transformer.

The apparatus for generating a self-check leakage current according to the present disclosure can realize the functional detection of the phase line solid-state switch or the neutral line solid-state switch of the current transformer before supplying power to the load equipment, thus avoiding the safety problem that the functional detection can only be carried out after supplying power. On the other hand, the apparatus for generating a self-check leakage current according to the present disclosure can realize the periodic detection of the power transmission and distribution devices such as the current transformers during power supply by controlling the phase line solid-state switch or the neutral line solid-state switch and the bypass switch constructed as a solid-state switch. Compared with the existing apparatus for generating or injecting leakage current for self-checking, the apparatus for generating a self-check leakage current according to the present disclosure does not need to arrange additional windings on the current transformer or an additional leakage current generating circuit. The reliability and service life of the whole apparatus is greatly improved because there is no mechanical contact for switching the power supply circuit and the leakage current generating circuit.

BRIEF DESCRIPTION OF DRAWINGS

In order to explain the technical scheme of the embodiment of the present disclosure more clearly, the accompanying drawings needed in the description of the embodiment will be briefly introduced below. The accompanying drawings in the following description are only exemplary embodiments of the present disclosure.

DETAILED DESCRIPTION

Figure 1:
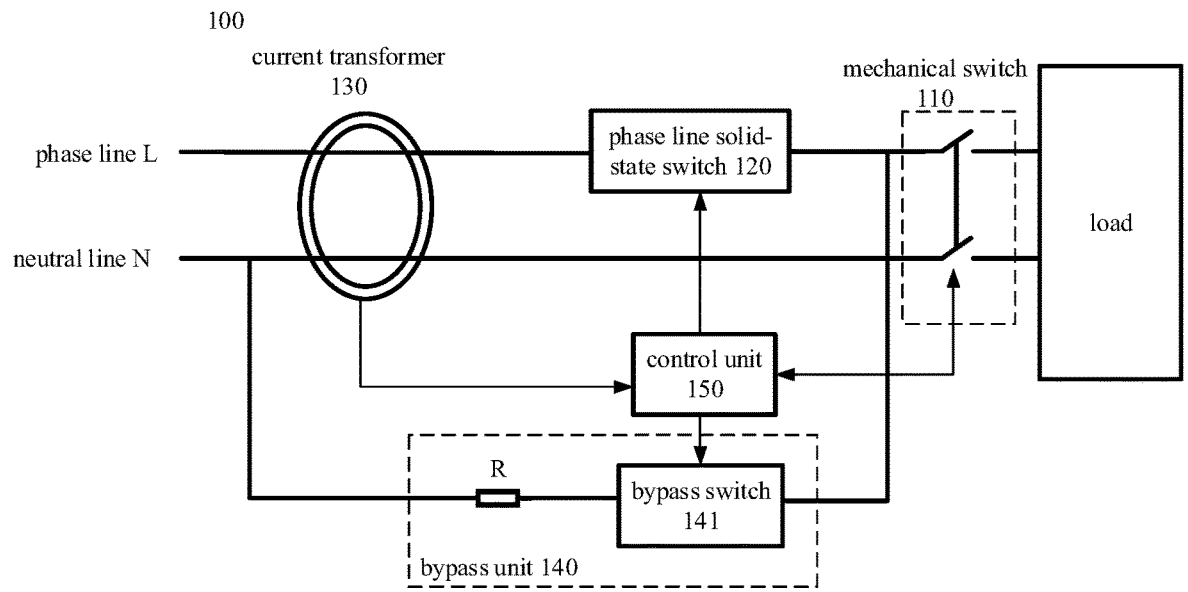
FIG. 1 illustrates a schematic diagram of an apparatus for generating a self-check leakage current according to an embodiment of the present disclosure.

To make the objects, technical schemes and advantages of the present disclosure more obvious, exemplary embodiments according to the present disclosure will be described in detail below regarding the accompanying drawings. Obviously, the described embodiments are only a part of the embodiments of the present disclosure, not all the embodiments of the present disclosure. It should be understood that the present disclosure is not limited by the exemplary embodiments described herein.

In this specification and the accompanying drawings, basically the same or similar steps and elements are denoted by the same or similar reference numerals, and repeated descriptions of these steps and elements will be omitted. Meanwhile, in the description of the present disclosure, the terms "first", "second" and so on are only used to distinguish descriptions, and cannot be understood as indicating or implying relative importance or order.

In this specification and the accompanying drawings, according to the embodiments, elements are described in singular or plural forms. However, the singular and plural forms are appropriately selected for the presented situations only for the convenience of explanation and are not intended to limit the present disclosure. Therefore, the singular form can include the plural form, and the plural form can also include the singular form unless the context clearly indicates otherwise.

FIG. 1 illustrates a schematic diagram of an apparatus 100 for generating a self-check leakage current according to an embodiment of the present disclosure. As shown in FIG. 1, the load is supplied with electric energy through the phase line (Live wire) L and the neutral line (Neutral wire) N. The current flows from the phase line L to the load and from the load flows back to the neutral line N. The leakage generating apparatus 100 according to the present disclosure includes a mechanical switch 110, a phase line solid-state switch 120, a current transformer 130, a bypass unit 140 and a control unit 150. The mechanical switch 110 serves as an isolating switch for mechanically switching on and off the phase line L and the neutral line N at the same time. The phase line solid-state switch 120 is arranged on the phase line L and located upstream of the mechanical switch 110. i.e., arranged further away from the load relative to the mechanical switch 110. The current transformer is arranged upstream of the phase line solid-state switch 120, i.e., arranged further away from the load relative to the phase line solid-state switch 120. The phase line L and the neutral line N pass through the current transformer 130. Under normal situations, the currents flowing through the phase line L and the neutral line N are equal in magnitude and opposite in direction, so the resulting magnetomotive force is zero. The voltage thus induced by the current transformer 130 surrounding the phase line L and the neutral line N is zero. When leakage occurs on the load, the current in the neutral line is smaller than the current in the phase line due to the shunt of the leakage current. The resulting magnetomotive force therefore is no longer zero, and the voltage induced by the current transformer 130 is no longer zero, so that it can be determined that there is a leakage. The bypass unit 140 includes a bypass switch 141 and a bypass resistor R connected in series. One end of the bypass unit 140 is connected between the mechanical switch 110 and the phase line solid-state switch 120 on the phase line L. and the other end is connected to the upstream of the current transformer 130 on the neutral line N. i.e., arranged further away from the load relative to the current transformer 130. When the bypass switch 141 is switched on the bypass unit 140 forms a new path with respect to a part of the neutral line N passing through the current transformer 130, so that all or part of the current flowing through the phase line L of the current transformer 130 can be prevented from passing through the current transformer 130 on the neutral line N. The control unit 150 is configured to control the switching on and off of the phase line solid-state switch 120 and the bypass switch 141, and to receive the current value detected by the current transformer 130. The self-check leakage current is generated when the phase line solid-state switch 120 and the bypass switch 141 are switched on.

In the embodiment according to the present disclosure, the control unit 150 may determine whether the functions of the current transformer 130 and the phase line solid-state switch 120 are normal according to the self-check leakage current detected by the current transformer 130 when the self-check leakage current is generated.

For example, the apparatus for generating a self-check leakage current according to the present disclosure may generate the self-check leakage current to check whether the functions of the current transformer 130 and the phase line solid-state switch 120 are normal before supplying power to the load. In the embodiment according to the present disclosure, when the mechanical switch 110 is to be closed to supply power to the load, the mechanical switch 110 sends a mechanical switch action signal to the control unit 150 before the mechanical switch 110 is closed, i.e., before the mechanical switch 110 reaches the dead point. According to the mechanical switch action signal, the control unit 150 quickly switches on the phase line solid-state switch 120 and the bypass switch 141, thus forming a self-check leakage current loop. In the self-check leakage current loop, the current flows from the phase line L through the current transformer 130 and the phase line solid-state switch 120, and then flows back to the neutral line N through the bypass unit 140 and without also passing through the current transformer 130. The magnitude of the formed the self-check leakage current depends on the magnitude of the bypass resistor R in the bypass unit 140. If the current transformer 130 can detect the self-check leakage current, the control unit 150 can determine that the functions of the current transformer 130 are normal and the functions of the phase line solid-state switch 120 are normal.

In the embodiment according to the present disclosure, the control unit 150 switches off the bypass switch 141 and switches on the phase line solid-state switch 120 when the functions of the current transformer 130 and the phase line solid-state switch 120 are normal. Power can be supplied to the load normally after the mechanical switch 110 is completely closed. If the control unit 150 finds that the current transformer 130 does not detect the current or the detected current does not meet the preset value, it is determined that the current transformer 130 or the phase line solid-state switch 120 has a fault. In this case, the control unit 150 switches off the bypass switch 141 and the phase line solid-state switch 120 and sends out a fault indication signal, so as to indicate the operator not to continue closing the mechanical switch 110.

In addition, the apparatus for generating a self-check leakage current according to the present disclosure, e.g., may also periodically generate the self-check leakage current to check whether the functions of the current transformer 130 are normal during the power supply to the load. In the embodiment according to the present disclosure, during the power supply to the load, the mechanical switch 110 is kept in the closed state, and the phase line solid-state switch 120 is kept switching on. When it is necessary to check the functionality of the current transformer 130, the control unit 150 switches on the bypass switch 141 for a short time. In this case, a part of the current flowing through the phase line L of the current transformer 130 is shunted back to the neutral line N by the bypass unit 140 without flowing through the current transformer 130, but the rest of the current flows to the load and returns to the neutral line N and flows through the current transformer N. Therefore, at the current transformer 130, the part of the current in the phase line L that is greater than the current in the neutral line N is equal to the shunt current flowing through the bypass unit 140. The shunt current can be detected by the current transformer 130 as a self-check leakage current.

In the embodiment according to the present disclosure, in the case that the current transformer 130 can detect the self-check leakage current, the control unit 150 determines that the functions of the current transformer 130 are normal, and switches off the bypass switch 141 to restore normal power supply. If the control unit 150 finds that the current transformer 130 does not detect the current or the detected current does not meet the preset value, it is determined that the current transformer 130 has a fault. In this case, the control unit 150 switches off the bypass switch 141 and the phase line solid-state switch 120 and sends out a fault indication signal, so as to indicate that the current transformer 130 has a fault or indicate the operator to open the mechanical switch 110.

Figure 2:
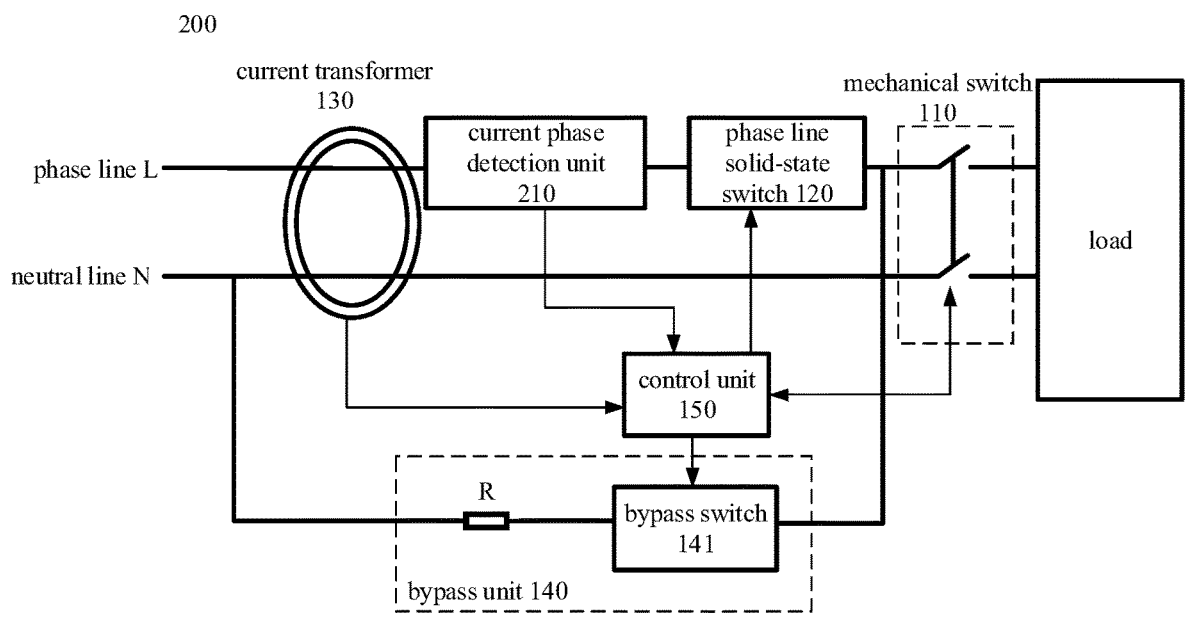
FIG. 2 illustrates a schematic diagram of an apparatus for generating a self-check leakage current according to another embodiment of the present disclosure.

FIG. 2 illustrates a schematic diagram of an apparatus 200 for generating a self-check leakage current according to another embodiment of the present disclosure. The apparatus 200 for generating a self-check leakage current is different from the apparatus 100 for generating a self-check leakage current shown in FIG. 1 in that an additional current phase detection unit 210. The current phase detection unit 210 is configured to detect the phase of the phase line current and to provide the phase to the control unit 150. The control unit 150 may switch on the bypass switch 141 according to the phase of the phase line current, so that the self-check leakage current has a predetermined initial phase. For example, in the case that the self-check leakage current is expected to have an initial phase of 45°, 90° or 135°, the control unit 150 may switch on the bypass switch 141 at the corresponding phase of 45°, 90° or 135° of the phase line current according to the phase of the phase line current detected by the current phase detection unit 210. Different initial phases of the self-check leakage current correspond to different current amplitudes, so the magnitude of the self-check leakage current, especially the instantaneous self-check leakage current, can be controlled by selecting to switch on the bypass switch 141 at different phases of the phase line current.

Figure 3:
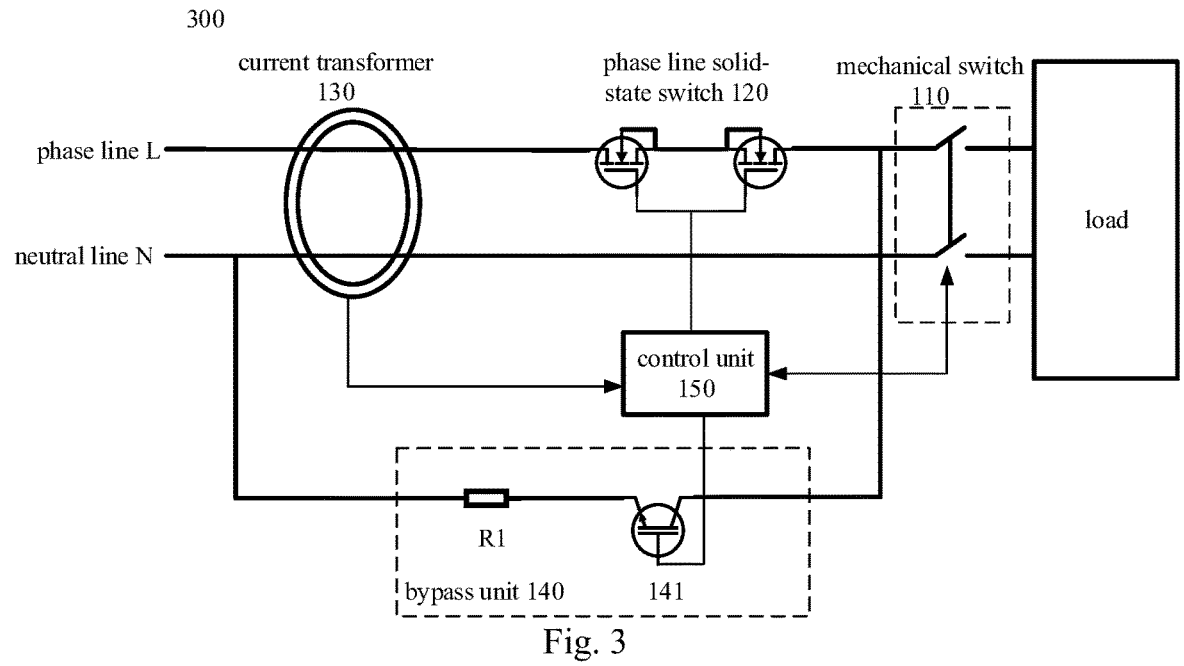
FIG. 3 illustrates a schematic circuit diagram of an apparatus for generating a self-check leakage current according to another embodiment of the present disclosure.

FIG. 3 illustrates a schematic circuit diagram of an apparatus 300 for generating a self-check leakage current according to another embodiment of the present disclosure. In the apparatus 300 for the self-check leakage current shown in FIG. 3, the phase line solid-state switch 120 is constructed as two anti-series connected MOSFETs (Metal Oxide Semiconductor Field Effect Transistor). The MOSFET may be, e.g., a Si MOSFET (silicon MOSFET) or a SiC MOSFET (silicon carbide MOSFET). Furthermore, in the embodiment according to the present disclosure, the phase line solid-state switch 120 can also be, e.g., constructed as a single IGBT (Insulated Gate Bipolar Transistor) or two anti-series connected IGBTs.

In the apparatus 300 for the self-check leakage current shown in FIG. 3, the bypass switch 141 is constructed as an IGBT. The IGBT is especially a high-voltage resistant IGBT, e.g., it can withstand a short-circuit current for 40 ms without requiring it to have a low conduction loss. Furthermore, in the embodiment according to the present disclosure, the bypass switch 141, e.g., can also be constructed as a bidirectional thyristor (TRIAC) or a MOSFET, especially two anti-series connected MOSFETs.

Figure 4:
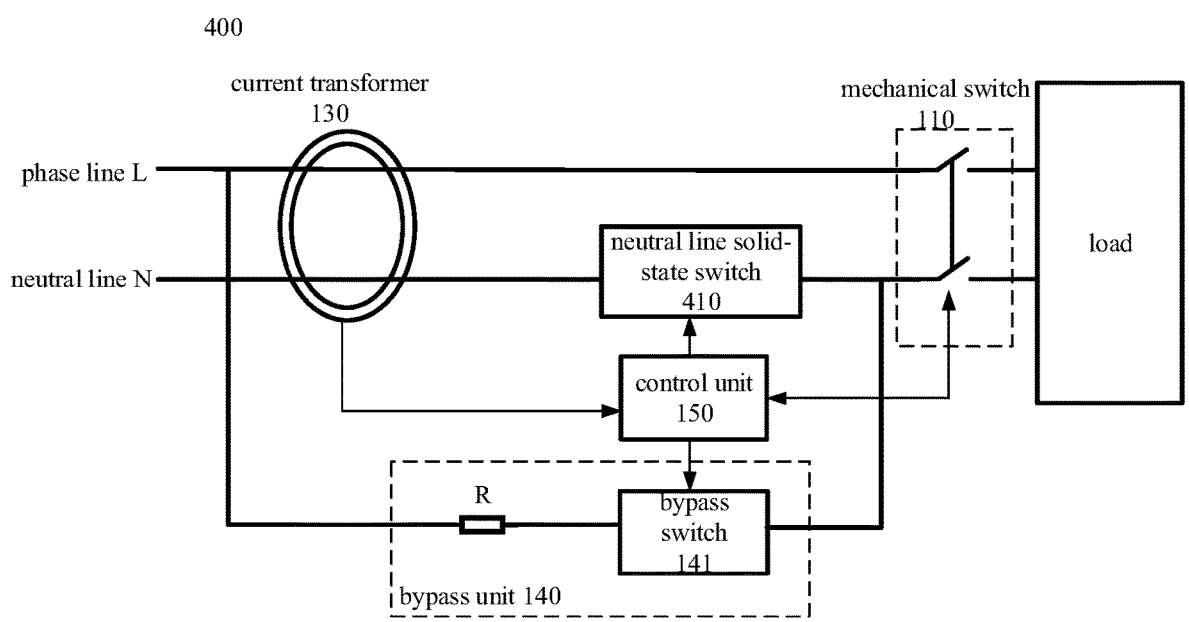
FIG. 4 illustrates a schematic diagram of an apparatus for generating a self-check leakage current according to another embodiment of the present disclosure.

FIG. 4 illustrates a schematic diagram of an apparatus 400 for generating a self-check leakage current according to another embodiment of the present disclosure. As shown in FIG. 4, the load is supplied with electric energy through the phase line (Live wire) L and the neutral line (Neutral wire) N. The current flows from the phase line L to the load and from the load flows back to the neutral line N. The leakage generating apparatus 400 according to the present disclosure includes a mechanical switch 110, a neutral line solid-state switch 410, a current transformer 130, a bypass unit 140 and a control unit 150. The mechanical switch 110 serves as an isolating switch for mechanically switching on and off the phase line L and the neutral line N at the same time. The neutral line solid-state switch 410 is arranged on the neutral line N and located upstream of the mechanical switch 110. The current transformer is arranged upstream of the neutral line solid-state switch 410. The phase line L and the neutral line N pass through the current transformer 130. The bypass unit 140 includes a bypass switch 141 and a bypass resistor R connected in series. One end of the bypass unit 140 is connected between the mechanical switch 110 and the neutral line solid-state switch 410 on the neutral line N. and the other end is connected to the upstream of the current transformer 130 on the phase line L. When the bypass switch 141 is switched on, the bypass unit 140 forms a new path with respect to a part of the phase line L passing through the current transformer 130, so that all or part of the current in the phase line L that has not flowed through the current transformer 130 can flow through the current transformer 130 on the neutral line N. The control unit 150 is configured to control the switching on and off of the neutral line solid-state switch 410 and the bypass switch 141, and to receive the current value detected by the current transformer 130. The self-check leakage current is generated when the neutral line solid-state switch 410 and the bypass switch 141 are switched on.

In the embodiment according to the present disclosure, in the case that the self-check leakage current is generated, the control unit 150 may determine whether the functions of the current transformer 130 and the neutral line solid-state switch 410 are normal according to the self-check leakage current detected by the current transformer 130.

For example, the apparatus 400 for generating a self-check leakage current according to the present disclosure may generate the self-check leakage current to check whether the functions of the current transformer 130 and the neutral line solid-state switch 410 are normal before supplying power to the load. In the embodiment according to the present disclosure, when the mechanical switch 110 is to be closed to supply power to the load, the mechanical switch 110 sends a mechanical switch action signal to the control unit 150 before the mechanical switch 110 is closed, i.e., before the mechanical switch 110 reaches the dead point. According to the mechanical switch action signal, the control unit 150 quickly switches on the neutral line solid-state switch 410 and the bypass switch 141, thus forming a self-check leakage current loop. In the self-check leakage current loop, the current starts from the phase line L and does not flow through the current transformer 130, but reaches the neutral line N through the bypass unit 140, and then flows through the neutral line solid-state switch 410 and the current transformer 130. The magnitude of the formed self-check leakage current depends on the magnitude of the bypass resistor R in the bypass unit 140. If the current transformer 130 can detect the self-check leakage current, the control unit 150 can determine that the functions of the current transformer 130 are normal and the functions of the neutral line solid-state switch 410 are normal.

In the embodiment according to the present disclosure, the control unit 150 switches off the bypass switch 141 and switches on the neutral line solid-state switch 410 when the functions of the current transformer 130 and the neutral line solid-state switch 410 are normal. Power can be supplied to the load normally after the mechanical switch 110 is completely closed. If the control unit 150 finds that the current transformer 130 does not detect the current or the detected current does not meet the preset value, it is determined that the current transformer 130 or the neutral line solid-state switch 410 has a fault. In this case, the control unit 150 switches off the bypass switch 141 and the neutral line solid-state switch 410 and sends out a fault indication signal, so as to indicate the operator not to continue closing the mechanical switch 110.

In addition, the apparatus 400 for generating a self-check leakage current according to the present disclosure, e.g., may also periodically generate the self-check leakage current to check whether the functions of the current transformer 130 are normal during the power supply to the load. In the embodiment according to the present disclosure, during the power supply to the load, the mechanical switch 110 is kept in the closed state, and the neutral line solid-state switch 410 is kept switching on. When it is necessary to check the functionality of the current transformer 130, the control unit 150 switches on the bypass switch 141 for a short time. In this case, a part of the current in the phase line L that does not flow through the current transformer 130 is shunted by the bypass unit 140 and flows back to the neutral line N, the rest of the current flows to the load and also returns to the neutral line N, and all the current in the neutral line flows through the current transformer 130. Therefore, at the current transformer 130, the part of the current in the phase line L that is less than the current in the neutral line N is equal to the shunt current flowing through the bypass unit 140. The shunt current can be detected by the current transformer 130 as a self-check leakage current.

In the embodiment according to the present disclosure, in the case that the current transformer 130 can detect the self-check leakage current, the control unit 150 determines that the functions of the current transformer 130 are normal, and switches off the bypass switch 141 to restore normal power supply. If the control unit 150 finds that the current transformer 130 does not detect the current or the detected current does not meet the preset value, it is determined that the current transformer 130 has a fault. In this case, the control unit 150 switches off the bypass switch 141 and the neutral line solid-state switch 410 and sends out a fault indication signal, so as to indicate that the current transformer 130 has a fault or indicate the operator to open the mechanical switch 110.

According to the embodiment of the present disclosure, the neutral line solid-state switch 410 may be constructed as two anti-series connected MOSFETs (Metal Oxide Semiconductor Field Effect Transistor). The MOSFET may be, e.g., a Si MOSFET (silicon MOSFET) or a SiC MOSFET (silicon carbide MOSFET). Furthermore, in the embodiment according to the present disclosure, the neutral line solid-state switch 410 can also be, e.g., constructed as a single IGBT (Insulated Gate Bipolar Transistor) or two anti-series connected IGBTs.

According to the embodiment of the present disclosure, the apparatus for generating a self-check leakage current may also be a combination of FIG. 1 and FIG. 4. i.e., the apparatus for generating a self-check leakage current includes both the phase line solid-state switch 120 and the neutral line solid-state switch 410. The bypass switch 141 can select to connect to the phase line and the neutral line either in the manner shown in FIG. 1 or in the manner shown in FIG. 4. Accordingly, the control unit 150 controls the switching on and off of the phase line solid-state switch 120 and the bypass switch 141 in the manner shown in FIG. 1, or controls the switching on and off of the neutral line solid-state switch 410 and the bypass switch 141 in the manner shown in FIG. 4, so as to generate a self-check leakage current, thereby detecting whether the functions of the current transformer 130, the phase line solid-state switch 120 and the neutral line solid-state switch 410 are normal.

The apparatus for generating a self-check leakage current according to the present disclosure, on the one hand, can realize the functional detection of the phase line solid-state switch and the neutral line solid-state switch of the current transformer before supplying power to the load equipment, thus avoiding the safety problem that the functional detection can only be carried out after supplying power. On the other hand, the apparatus for generating a self-check leakage current according to the present disclosure can realize the periodic detection of the power transmission and distribution devices such as the current transformers during power supply by controlling the phase line solid-state switch or the neutral line solid-state switch and the bypass switch constructed as a solid-state switch. Compared with the existing apparatus for generating or injecting leakage current for self-checking, the apparatus for generating a self-check leakage current according to the present disclosure does not need to arrange additional windings on the current transformer or an additional leakage current generating circuit, and because there is no mechanical contact for switching the power supply circuit and the leakage current generating circuit, the reliability and service life of the whole apparatus are greatly improved.

The block diagrams of circuits, units, devices, apparatus, equipment and systems involved in the present disclosure are only as illustrative examples, and are not intended to require or imply that they must be connected, arranged and configured in the manner shown in the block diagram. As those skilled in the art will recognize, these circuits, units, devices, apparatus, equipment and systems can be connected, arranged and configured in any manner, as long as the desired purpose can be achieved. The circuits, units, devices and apparatus involved in the present disclosure can be realized in any suitable manner.

It should be understood by those skilled in the art that the above-mentioned specific embodiments are only examples rather than limitations, and various modifications, combinations, partial combinations and substitutions can be made to the embodiments of the present disclosure according to design requirements and other factors, as long as they are within the scope of the appended claims or their equivalents, i.e., they belong to the scope of rights to be protected by the present disclosure.

What is claimed is:

1. An apparatus for generating a self-check leakage current, comprising:
   a mechanical switch which is configured to simultaneously switch on and off a phase line and a neutral line,
   a phase line solid-state switch arranged on the phase line and located upstream of the mechanical switch,
   a current transformer arranged upstream of the phase line solid-state switch, and the phase line and a neutral line pass through the current transformer,
   a bypass unit comprising a bypass switch and a bypass resistor connected in series, one end of the bypass unit is connected between the mechanical switch and the phase line solid-state switch on the phase line, and the other end is connected to the upstream of the current transformer on the neutral line, and
   a control unit, which is configured to control the switching on and off of the phase line solid-state switch and the bypass switch, and to receive a current value detected by the current transformer,
   wherein the self-check leakage current is generated when the phase line solid-state switch and the bypass switch are switched on.

2. The apparatus of claim 1, wherein in a case of generating the self-check leakage current, the control unit determines whether functions of the current transformer and the phase line solid-state switch are normal according to the self-check leakage current detected by the current transformer.

3. The apparatus of claim 2, wherein the control unit switches off the bypass switch and switches on the phase line solid-state switch when the functions of the current transformer and the phase line solid-state switch are normal, otherwise, the control unit switches off the bypass switch and the phase line solid-state switch and sends out a fault indication signal.

4. The apparatus of claim 1, wherein before the mechanical switch is closed, the control unit switches on the phase line solid-state switch and the bypass switch.

5. The apparatus of claim 4, wherein before the mechanical switch is closed, the control unit switches on the phase line solid-state switch and the bypass switch.

6. The apparatus of claim 1, further comprising:
   a current phase detection unit which is configured to detect a phase of a phase line current and to provide the phase to the control unit,
   wherein the control unit switches on the bypass switch according to the phase of the phase line current, so that the self-check leakage current has a predetermined initial phase.

7. The apparatus of claim 1, wherein the phase line solid-state switch is constructed as two anti-series connected MOSFET.

8. The apparatus of claim 1, wherein the bypass switch is constructed as an IGBT.

9. The apparatus of claim 6, wherein the phase line passes through the current transformer to a first input of the current phase detection unit, and a first output of the current phase detection unit is coupled to a second input of the phase line solid-state switch.

10. The apparatus of claim 1, wherein the phase line is coupled to a first input of the phase line solid-state switch and an output of the phase line solid-state switch is coupled to a second input of the mechanical switch.

11. The apparatus of claim 10, wherein the output of the phase line solid-state switch is coupled to the bypass switch.

12. The apparatus of claim 10, wherein the phase line passes through the current transformer to the first input of the phase line solid-state switch.

13. The apparatus of claim 1, wherein the control unit is configured to:
   open the mechanical switch to switch off the phase line and the neutral line;
   close the phase line solid-state switch; and
   close the bypass switch, wherein the opening of the mechanical switch and the closing of the phase line solid-state switch and the bypass switch causes current to flow from the phase line through the phase line solid-state switch and the bypass switch and back to the neutral line without passing through the current transformer.

14. An apparatus for generating a self-check leakage current, comprising:
   a mechanical switch which is configured to simultaneously switch on and off a phase line and a neutral line,
   a neutral line solid-state switch arranged on the neutral line and located between the mechanical switch and a current transformer,
   the current transformer arranged upstream of the neutral line solid-state switch, and the phase line and the neutral line pass through the current transformer,
   a bypass unit comprising a bypass switch and a bypass resistor connected in series, one end of the bypass unit is connected to the upstream of the current transformer on the phase line, and the other end is connected between the mechanical switch and the neutral line solid-state switch on the neutral line, and
   a control unit which is configured to control the switching on and off of the neutral line solid-state switch and the bypass switch, and to receive a current value detected by the current transformer,
   wherein the self-check leakage current is generated when the neutral line solid-state switch and the bypass switch are switched on.

15. The apparatus of claim 14, wherein in a case of generating the self-check leakage current, the control unit determines whether functions of the current transformer and the neutral line solid-state switch are normal according to the self-check leakage current detected by the current transformer.

16. The apparatus of claim 14, wherein the bypass switch is coupled to the bypass resistor.

17. The apparatus of claim 14, wherein the neutral line is coupled to a first input of the neutral line solid-state switch and an output of the neutral line solid-state switch is coupled to a second input of the mechanical switch.

18. The apparatus of claim 17, wherein the neutral line passes through the current transformer to the first input of the neutral line solid-state switch.

19. The apparatus of claim 17, wherein the output of the neutral line solid-state switch is coupled to the bypass switch.

20. A circuit comprising:
   a mechanical switch comprising a first mechanical switch input and a second mechanical switch input,
   a phase line solid-state switch comprising a first input and a first output, the first input coupled to a first wire corresponding to a phase line, the first output coupled to the first mechanical switch input such that the phase line solid-state switch is upstream to the mechanical switch,
   a bypass switch comprising a first end and a second end, the first end coupled to a second wire corresponding to a neutral line, the second end coupled to at least one of the first output or the first mechanical switch input, and
   a control unit configured to control the phase line solid-state switch, the bypass switch, and the mechanical switch to generate a leakage current.

* * * * *